UNITED STATES PATENT OFFICE.

WALTHER FELD, OF HÖNNINGEN-ON-THE-RHINE, GERMANY.

EXTRACTION OF TAR AND TAR CONSTITUENTS FROM GASES.

965,147.     Specification of Letters Patent.     Patented July 19, 1910.

No Drawing.     Application filed May 7, 1910. Serial No. 560,058.

*To all whom it may concern:*

Be it known that I, WALTHER FELD, a subject of the King of Prussia and the German Emperor, of Hönningen-on-the-Rhine, in the Kingdom of Prussia and German Empire, have invented new and useful Improvements in the Extraction of Tar and Tar Constituents from Gases, of which the following is a specification.

Recently the extraction of tar from gases has been effected by means of hot tar before the gases are cooled to atmospheric temperature. This process, as described in the specification of Letters Patent No. 951,778 A. D. 1910 granted to me, offers no difficulty with gases, the temperature of which is kept above the dew point of water, and in using tar, or tar oils, free of water, as a washing liquid. In many cases, however, in which tar, or tar constituents, are to be extracted from gases, the gases are saturated with water, and in such cases, tar, or tar constituents, mixed with water, will be separated and the washing effect will be considerably affected. The simultaneous separation of water and tar prevents the fine tarry mist from combining to form drops. In such cases, means must be provided to avoid the simultaneous separation of water and tar.

According to my aforesaid Patent 951,778 A. D. 1910 the separation of an undesired constituent is generally avoided by raising the gases above the dew point of the undesired constituent, or by lowering the dew point of the undesired constituent by adding extraneous gases, or vapors.

In order to separate tar, or tar constituents, from water-saturated gases I, according to my present invention, proceed as follows. The water-saturated gases are, before entering the tar-washer, superheated and then treated with the washing liquid, which is also heated to the same, or to a higher, temperature. I proceed in the same way in extracting tar constituents, for instance naphthalene, from gases.

The following is a description of an example of the process according to my present invention, presuming that coal gas is to be treated at an elevated temperature for the extraction of tar, and afterward naphthalene is to be separated. Supposing the dew point of these gases for water to be 70° centigrade, and for naphthalene 30° centigrade, and that these gases come from the mains and coolers saturated with water (that is to say at 70° centigrade), a considerable portion of tar, together with a small amount of water, will be condensed in the main and in the coolers. The gases therefore will contain also water fog, as well as fogs of finely divided tarry matters. In order to successfully separate tar, by combining the tar fogs to tar drops, means must be provided to insure that no water is separated with the tar. For this purpose the gases are, before, or when, entering the tar washers, superheated to such an extent as is necessary to evaporate the water fog. Although superheating from 70° to 72° centigrade would be sufficient, it is better to superheat to, or above, 80° centigrade. The superheating may be performed by any external, or internal, supply of heat, for instance by pipes heated by steam, or by the hot gases themselves, coming from the ovens, or retorts, or by waste gases, or the like, using the principal of counter-current; or if superheated gases, or vapors, (for instance superheated steam) be introduced into the gases. It will also answer the purpose if the washing liquid be correspondingly heated and the gases be treated with such a quantity thereof that the necessary heat is supplied to the gases in the washing process. The amount of heat necessary for the superheating of the water-saturated gases, for instance from 70°, to 80°, centigrade, results from the following calculation. The water-saturated gases at 70° centigrade have a heat capacity of 0.5 calories per cubic meter (calculated at 0° centigrade and in a dry state). In order to superheat the gases from 70° to 80° centigrade, 5 calories are necessary. The specific heat of tar (free of water) is also 0.5 calories. In order to treat the gases of 70° centigrade at 80° centigrade with one liter of tar of 80° centigrade, this tar must be heated to about 90° centigrade and then be intimately treated with the gases of 70° centigrade. By this treatment, the gases will be heated from 70° to 80° centigrade and the tar be cooled from 90° to 80° centigrade. If more than one liter of tar be used for one cubic meter of gas, the tar may be correspondingly less heated; if less tar be used, it must be heated to a correspondingly higher degree. In case the gases enter the tar washer water-saturated, they contain, as hereinbefore explained, finely divided water fogs, which must be evaporated. In this case the supply of heat and the heating of the tar must be increased accordingly. This will be also necessary if the tar, used for the treatment of the gases, contain water. In this case the tar, or the gases, or both, is, or are, heated to an extent necessary to evaporate the water from the washing tar. As long as the gases contain water fogs, or the tar contains water, the extraction of tar is incomplete. By using, over and over again, for the washing process, the tar running from the washing apparatus, and by removing only the excess of such tar, the washing tar will become free of water after some time. Instead of tar, tar oils, or the like, may be used, the process being always the same. For this purpose any suitable apparatus may be used which will allow intimate treatment of the gases with the washing liquid. A convenient apparatus is such as is described in the specification of my Patent No. 829,261 A. D. 1906. Or exhaust apparatus, or fans, by which the washing liquid is injected, or centrifugal apparatus of any suitable kind, or injectors, or spraying apparatus, and the like, may be used for the purpose. In order that the last traces of tar may be extracted from the gases, a so-called Pelouze apparatus may be employed in combination with the gas washer. Means should be provided to insure that the gases are not cooled to the dew point for water if they pass this apparatus, and, for this purpose, it is convenient to have the apparatus and pipe connections, by which the gases pass in the washing process, protected against cooling effects by insulation, or to have the gases so far superheated that they are not cooled to the dew point of water saturation while they are passing the tar extractors.

After the aforesaid treatment, the gases will be free of tar at 70° centigrade, but they will be saturated with tar oils of high boiling points according to their quantity and point of evaporation. It will be the same with gases the dew point of which is above, or below, 70° centigrade.

After the extraction of tar, the gases may be conveniently treated for the extraction of cyanogen and ammonia. In order that in these operations no tar oils shall be separated, the gases should be again raised (according to the aforesaid Patent 951,778 A. D. 1910) above the dew point of the tar oils left in the gases. As the washing liquids are such as contain water, the gases, which were superheated in the tar extraction, will again be saturated with water. The dew point of the gases for tar oils should therefore be lowered by adding gases, or by injecting vapors, which may be done according to British Patents Nos. 27,567 and 28,390 A. D. 1907. The extraction of ammonia may be conveniently performed by acids, or by salt solutions, eventually simultaneously with the cyanogen, for instance according to the Patent 806,467 A. D. 1905, or by any other suitable process, at 70° centigrade, or above. After adding gases which contain only a small quantity of tar oils, the extraction of ammonia may, if desired, be performed at a lower temperature than 70° centigrade without tar oils being separated. After the gases have thus been freed from tar, cyanogen, and ammonia, they must be cooled. In cooling below 70° centigrade, tar oils will be separated according to the Patent 951,778 A. D. 1910, but the amount of these tar oils is but small in coal gases.

As the dew point of the gases for naphthalene lies at about 30° centigrade, there is the danger that the small amount of tar oils, separated when the gases are cooled from 70° to 30° centigrade, will not be sufficient to dissolve the naphthalene deposited at 30° centigrade. In cooling, water will be separated, as well as tar oils, according to the lowering of the tension of water vapors from 70° to 30° centigrade, and therefore the tar oils separated will contain water, whereby their washing and dissolving efficiency will be affected. If this be the case, the gases are, in the first instance, only cooled to 30° centigrade, and then they are, according to this invention, treated with a washing medium for the extraction of naphthalene. Also the treatment hereinbefore described for the extraction of tar is effected in such a way that the gases, which are water-saturated at 30° centigrade, are superheated and then treated with the washing liquid, in order to prevent the separation of water and the reduction of the washing efficiency. The operation is the same as hereinbefore described for the tar extraction. In this present case, superheating of the gases from 33° to 36° centigrade will be sufficient, although it may be higher, but then the dissolving power of the washing liquid for naphthalene will be diminished. Any solvent for naphthalene may be used as a washing liquid, but it is preferable to use, for this purpose, high boiling tar oils, or tar, which may be those obtained by the previous treatment of the gases. After the extraction of naphthalene is performed, the gases may be cooled to the desired temperature without any danger of obstruction by naphthalene. The small amount of naphthalene which might be deposited will be dissolved by tar oils and be condensed simultaneously. Instead of the separated extraction of tar and naphthalene, both these may be extracted simultaneously by first cooling the gases to the dew point of naphthalene and then treating them according to the process described.

If, in the process for extracting tar, tar oils, or tar, be used containing much medium, or light, oils of low boiling points, and if the washing liquid be strongly heated before entering the gas washers, a corresponding amount of vapors of the said oils will be incorporated with the gases. In this case, when afterward cooling the gases, the said oils will be separated simultaneously with the naphthalene, which will therefore be dissolved, and consequently special treatment of the gases for the extraction of naphthalene will not be necessary.

Instead of extracting cyanogen and ammonia from the gases after the extraction of tar, these operations may be performed after the extraction of naphthalene, for example by dissolving the ammonia by acid, or by a salt solution, or by water. In this latter case, it is convenient to reintroduce the ammonia obtained in the form of weak ammonia liquors, into the warm gases according to Patent No. 830,983 A. D. 1906. If then the gases be cooled in a separate surface cooler, for instance from 55°, or 45°, to 30°, or 20°, centigrade, strong ammonia liquors will be obtained, which, according to the conditions and to the amount of ammonia in the gases, may be raised to from 7 to 10 per cent. If, for instance, the crude gases contain 8 grams of ammonia per cubic meter, of which 2 grams may be condensed with the water separated before, and after, the tar extraction, in cooling down to about 55° centigrade, and of which a further 2 grams may be dissolved by water after the naphthalene extraction, and if the ammonia of these weak liquors thus obtained be introduced by distillation into the gases before they are cooled to, or under, 55° centigrade, the gases will be of a temperature of between 55° and 30° centigrade and 8 grams of ammonia will be deposited. As, at from 55° to 30° centigrade, 112 grams of water will be separated simultaneously, this water will contain about 7.8 per cent. of ammonia. After further cooling, for instance from 30° to 20° centigrade, the remaining 2 grams of ammonia will be extracted by water and these 2 grams will, as aforesaid, be reintroduced into the gases.

I claim—

1. In the aforesaid process of extracting tar and tar constituents from gases containing water; superheating the gases above their dew point of water saturation, before, and while, the extraction of tar and tar constituents is performed.

2. In the aforesaid process of extracting tar and tar constituents from gases containing water; the employment of washing liquid heated to a temperature sufficient to keep the gases under treatment above their dew point of water saturation.

3. In the aforesaid process of extracting tar and tar constituents from gases containing water; superheating the gases above their dew point of water saturation, before and while the extraction of tar and tar constituents is performed, cooling said gases, again superheating the gases, and treating the same with a washing liquid for the extraction of naphthalene.

In testimony whereof I have signed my name to this specification in the presence of two subscribing witnesses.

WALTHER FELD.

Witnesses:
 LOUIS VANDORN,
 ROBERT DUNLAP.